(12) United States Patent
Charra et al.

(10) Patent No.: US 8,006,315 B2
(45) Date of Patent: Aug. 23, 2011

(54) PHOTON-EMISSION SCANNING TUNNELING MICROSCOPY

(75) Inventors: Fabrice Charra, Marcoussis (FR); Matthieu Silly, Palaiseau (FR); Patrick Soukiassian, Remy les Chevreuse (FR)

(73) Assignees: Commissariat a l'Energie Atomique, Paris (FR); Universite Paris SUD (Paris II), Orsay (FR)

( * ) Notice: Subject to any disclaimer, the term of this patent is extended or adjusted under 35 U.S.C. 154(b) by 375 days.

(21) Appl. No.: 12/087,103

(22) PCT Filed: Dec. 20, 2006

(86) PCT No.: PCT/FR2006/002812
§ 371 (c)(1),
(2), (4) Date: Jan. 12, 2009

(87) PCT Pub. No.: WO2007/074228
PCT Pub. Date: Jul. 5, 2007

(65) Prior Publication Data
US 2009/0300805 A1    Dec. 3, 2009

(30) Foreign Application Priority Data
Dec. 28, 2005   (FR) ..................... 05 13429

(51) Int. Cl.
*G01N 13/00* (2006.01)
*G12B 1/00* (2006.01)

(52) U.S. Cl. .................. 850/26; 850/1; 850/3; 850/6

(58) Field of Classification Search ............. 850/6, 26
See application file for complete search history.

(56) References Cited

U.S. PATENT DOCUMENTS
5,559,330 A * 9/1996 Murashita .............. 850/6

FOREIGN PATENT DOCUMENTS
EP    1 014 456    6/2000
FR    2 704 349    10/1994

OTHER PUBLICATIONS

Horn J et al.: "High resolution surface characterization using STM light emission techniques"—Materials Science Forum Switzerland, vol. 185-188, 1995, pp. 145-153, XP0080156159, ISSN: 0255-5476.
Samuelson et al.: "Tunnel-induced photon emission in semiconductors using a, STM", Physica Scripta T, Royal Swedish Academy of Science, Stockholm, SE, vol. T42-1992, pp. 149-152, XP008049441, ISSN: 0281-1847.

(Continued)

*Primary Examiner* — David A Vanore
(74) *Attorney, Agent, or Firm* — McKenna Long & Aldridge LLP

(57) ABSTRACT

The present invention relates to an indirect-gap semiconductor substrate, the gap being greater than that of silicon and preferably greater than 1.5 eV, to its use for imaging a specimen by photon-emission scanning tunnel microscopy, and to a photon-emission scanning tunnel imaging method using such an indirect-gap semiconductor substrate. Advantageously, the indirect-gap semiconductor substrate is made of silicon carbide. The present invention also relates to devices for implementing the imaging method according to the invention.

19 Claims, 3 Drawing Sheets

OTHER PUBLICATIONS

Evoy et al.: "Low-temperature scanning tunneling microscope-induced iluminescence of an InGaN/GaN multiquantum well"—Applied Physics Letters, AIP, American Institute of Physics, Melville, NY, US, vol. 74, No. 10, Mar. 8, 1999, pp. 1457-1459, XP012022170, ISSN: 0003-6951.

Doege et al.: "Scanning tunneling microscopy, spectroscopy and tunneling-induced light emission on donor-doped BaTi03"—Surface Science, North-Holland Publish. Co. Amsterdam, vol. 566-568, Sep. 20, 2004, pp. 1211-1216, XP 004562240, ISSN: 0039-6028.

Rossow et al.: "Reflectance difference spectroscopy spectra of clean (3x2), (2x1), and c(2x2) 3C-SiC(001) surfaces: New evidence for surface state contributions to optical anisotropy spectra"—Journal of Vacuum Science & technology B: Microelectronics processing and Phenomena, American Vacuum Society; New-York, NY, US, vol. 16, No. 4, Jul. 1998, pp. 2355-2357, XP012007020, ISSN: 0734-211X.

Soukiassian P: "Cubic silicon carbide surface reconstructions and Si(C) nanostructures at the atomic scale"—Materials Science and Engineering, B. Elsevier Sequoia, Lausanne, CH—vol. 96, No. 2, Nov. 1, 2002, pp. 115-131, XP004387678, ISSN: 0921-5107.

Berndt et al.: "Atomic Resolution in Photon Emission Induced by a Scanning Tunneling Microscope"—Physical Review Letters, vol. 74, No. 1, Jan. 2, 1995, pp. 102-105.

Sakurai et al.: "Optical Selection Rules in Light Emission from the Scanning Tunneling Microscope"—Physical Review Letters, vol. 93, No. 4, Jul. 23, 2004, The American Physical Society—046102.

* cited by examiner

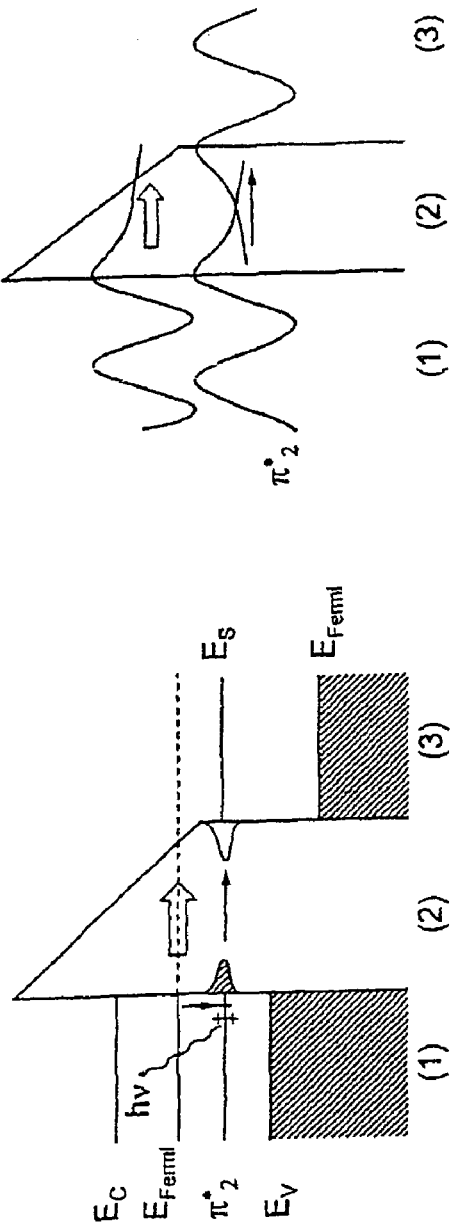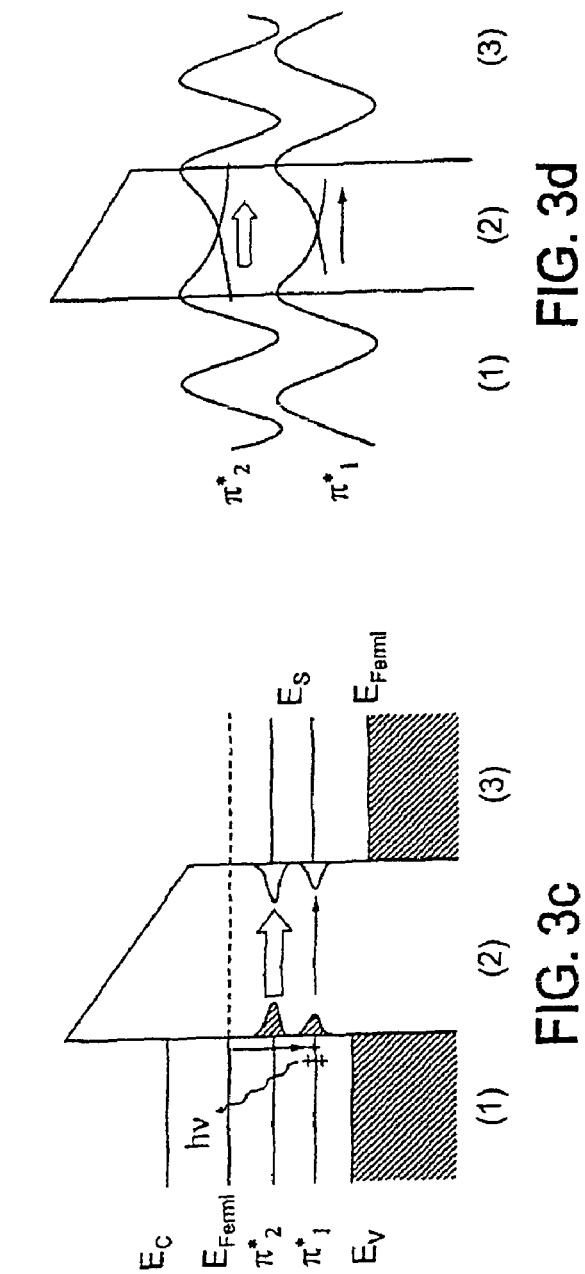

PHOTON-EMISSION SCANNING TUNNELING MICROSCOPY

This application claims the benefit of International Application Number PCT/FR2006/002812 filed on Dec. 20, 2006 and French Application No. 0513429 filed on Dec. 28, 2005, both of which are hereby incorporated by reference as if fully set forth herein.

The present invention relates to the field of near field microscopy, more particularly to scanning tunneling microscopy (STM).

The principle of STM microscopy consists in moving a fine, biased metal tip over a substrate consisting of a conductive or semiconductive surface, in the course of a horizontal scan in a plane parallel to the surface of the substrate on which the sample is located. STM microscopy typically allows a topography at the atomic scale of the local chemistry of a surface to be obtained. For example, STM microscopy allows the forbidden band width of semiconductors to be determined, densities of electronic states of a surface under analysis to be made visible, or the interaction of an organic molecule with a surface to be analyzed.

Despite a good atomic resolution, one of the main problems of methods known to the prior art is that they are limited to substrates consisting of gold, silver or silicon (Berndt et al., Phys. Rev. Lett., 1995, 74, 102-105; Sakurai et al., Phys. Rev. Lett., 2004, 93, 46102). In this case, the emission of photons allowing the atomic resolution results mainly from the excitation of a surface plasmon. However, the deposition of a sample on these types of substrate inevitably leads to the extinction of the emission of photons coming from the surface and prevents any detection.

SUMMARY

The present invention improves the situation. It proposes, to this end, a photon-emission scanning tunneling imaging method using an indirect gap semiconductor substrate.

"Gap" designates the width of the forbidden band of a semiconductor. "Large gap" designates any gap with a value typically higher than that of the gap of silicon (preferably higher than 1.5 eV). "Small gap" designates any gap with a value less than that of the gap of silicon.

An "indirect gap semiconductor" designates any semiconductor for which the energy maximum of the valence band and the minimum of the conduction band do not coincide at the center of the Brillouin zone.

The invention also relates to an indirect gap semiconductor substrate employed in this photon-emission scanning tunneling imaging method. Such a substrate is particularly suited as a deposition surface for a sample that a user wishes to analyze with scanning tunneling microscopy.

In particular, an advantageous substrate has in its electronic band diagram, at least in the conditions of photon-emission scanning tunneling microscopy, a permitted electronic transition at the center of the first Brillouin zone between a volume state and a surface state, while the bulk material itself has an indirect gap.

In fact, in this type of substrate, a maximum of the valence band of the bulk band structure corresponds, at the center of the first Brillouin zone, to a minimum of the conduction band of the surface band structure.

It is indicated here that silicon carbide Si—C with a (4×2) or (3×2) surface reconstruction is an example of a substrate having this property.

It is also indicated that, in the aforementioned conditions of photon-emission scanning tunneling microscopy, the photon emission caused by the electrons (electroluminescence, cathodoluminescence) takes place at the atomic scale, and hence with an atomic resolution. Hence, in these conditions, the surface of the substrate has a "unique" character with no risk of being found again, in particular in the document: P. Soukiassian et al. "Cubic silicon carbide surface reconstructions and Si(C) nanostructures at the atomic scale", Materials Science and Engineering B, Elsevier Sequoia, Lausanne, CH, vol. 96, no. 2 (pages 115-131). The concern is thus with a new substrate for photon imaging applications at atomic resolution not disclosed in this document by Soukiassian et al.

Finally, the invention relates to devices for implementing the imaging method according to the invention.

The photon-emission scanning tunneling imaging method according to the invention comprises the following steps:

deposition on a semiconductor substrate with an indirect gap greater than that of silicon, preferably greater than 1.5 eV, of a sample with an excitation energy of less than the gap value;

application of a potential $V_1$ to the substrate;

scanning of the sample by an electron injection and/or extraction device at a potential $V_2$, such that the potential difference $V_t$ between $V_1$ and $V_2$ enables a tunnel current to appear between the substrate on which the sample is deposited and the device; and detection of the photons emitted.

In the scope of the invention, the substrate is a semiconductor with an indirect and large gap (typically greater than that of silicon, preferably greater than 1.5 eV, and more preferably between 2.2 eV and 3.3 eV). Advantageously, such indirect gap semiconductor substrates are silicon carbide (SiC) or gallium phosphide (GaP). The silicon carbide may be chosen from among cubic SiC and hexagonal 4H polytype SiC. When the substrate is hexagonal 4H polytype SiC, it is preferable to use β-SiC, the surface of which is silicon terminated and c(4×2) reconstructed, in order to profit from the presence of silicon dimers at the surface of the substrate. The coupling between the silicon dimers is visible through the method according to the invention. The perturbation effect linked with the presence of the sample is hence easily detectable.

One possible explanation of the particularly satisfactory results of the implementation of the invention is attributable to the surface properties of the large indirect gap semiconductor substrate, in particular of the silicon carbide (SiC) such as described above. Due to the fact that the semiconductor has an indirect gap, an electronic transition with photon emission is normally forbidden. However, it has been observed that such an electronic transition with photon emission could nonetheless be observed in such a substrate and allowed in particular a very high detection precision in STM microscopy, with a resolution at the atomic level.

Thus, the invention relates to a photon-emission scanning tunneling method for imaging a sample comprising the following steps:

deposition on a β-SiC substrate, the surface of which is silicon terminated and c(4×2) reconstructed, of the sample with an excitation energy of less than the gap value;

application of a potential $V_1$ to the substrate;

scanning of the sample by an electron injection and/or extraction device at a potential $V_2$, such that the potential difference vt between $V_1$ and $V_2$ enables a tunnel current to appear between the substrate on which the sample is deposited and the device; and detection of the photons emitted.

An "electron injection and/or extraction device" is understood to mean any means capable of providing and/or extracting an electron through application of a potential difference.

According to a preferred embodiment, the electron injection/extraction device consists of a metal tip. Generally, it is a nanometer-sized tip of a scanning tunneling electron microscope. The metal tip preferably comprises a metal selected from among silver, platinum, iridium, tungsten and an alloy of these. In the remainder of the exposition, reference will be made to the term "tip" in a general way referring to any electron injection and/or extraction device.

"Scanning" is understood to mean the movement of the tip of a scanning tunneling microscope, on the vertical of the sample deposited on the substrate and in a plane parallel to the surface of said substrate, at a distance such that a tunnel current can be established between the two electrodes formed by the tip and the substrate/sample. Typically, such a distance is subnanometric.

The scanning is generally computer controlled. The means usually employed in the field of scanning tunneling atomic microscopy imaging can be applied to the method according to the invention. Furthermore, the conditions for implementing scanning are those usually used in the field of imaging by scanning tunneling microscopy.

The method is preferably carried out in the conditions usually used in scanning tunneling microscopy and known to the person skilled in the art.

By positioning a tip in immediate proximity to the surface of the sample deposited on the semiconductor substrate according to the invention, it is possible to demonstrate, by simple detection, a photon emission induced by the biased tunnel junction.

According to a first embodiment, the tip bias is greater than that of the substrate, the work function of the tip being less than the bias. The topographic resolution is reduced when the photon emission resolution is at the atomic scale (FIGS. 1 and 2). The photon yield, which corresponds to the proportion of electrons participating in the photon emission is low; among the electrons participating in the topographic imaging, only a tiny part participates in the emission of photons.

According to a second embodiment, the tip bias is less than that of the substrate. The contamination of the tip may increase the work function of the tip and favor photon-emission conditions. The tip is preferably brought into the presence of foreign elements chosen from among O, H, CO, NO in a residual vacuum. The degree of contamination may be adapted by varying the quantity of foreign elements. Advantageously, the tip is contaminated until traces of the foreign elements are detected there. The topographic resolution and the photon emission resolution are at the atomic scale. In fact, the photon yield is much higher in this second embodiment than in the first embodiment, in which the tip bias is greater than that of the substrate. However, the photon yield remains negligible relative to the main tunnel current, which enables the topography of the sample to be obtained. There again, the phenomenon of electron-hole recombination occurs between the surface states.

The photon emission mechanism is linked with the creation of surface holes which recombine with electrons. The photons are emitted according to a quantum process and directly take account of the surface states. The photons can be detected in all directions and their energy is less than the quantity of energy $e_{Vt}$ necessary for an electron to pass the tunnel barrier.

The method according to the invention comprises a step of detection using a suitable device. The photon detection device is preferably chosen depending on the detection areas. Devices that can be used for the detection are chosen in particular from among photomultipliers (~2-4 eV), microchannel plates (~1.5 eV), cooled CCD networks (~1 eV) and avalanche photodiodes (~1 eV), depending on what the observer wants to observe. Typically, a photon counter device will be able to be used.

Advantageously, the method may comprise a photomultiplication step, employing methods known to the person skilled in the art, in particular by using a photomultiplier or any other suitable device.

The method may comprise an additional focusing step which will be implemented by any optical means directing and/or concentrating the emitted photons toward a detector. Advantageously, a lens with a large numerical aperture will be able to be used.

It is also possible to place a polarizer in the proximity of the sample.

Photon emission imaging techniques enable photon maps to be drawn of the areas explored, which represent the number of photons emitted at each point of the area explored on the surface of a sample. A step of analyzing photons after their detection is typically carried out by computer processing, this step also relating to the employment of a means allowing visual representation of the observation carried out. The means used by the person skilled in the art in imaging by scanning tunneling atomic microscopy can be applied to the present method to carry out the analysis.

Advantageously, the method according to the invention is preferably carried out at low pressure, preferably at ultrahigh vacuum. The standard conditions used in scanning tunneling microscopy are recommended, preferably at pressures varying between $10^{-11}$ and $10^{-8}$ Torr. The method enables analysis of any type of sample deposited on the surface of the substrate. The thickness of the sample deposited is at least 1 monolayer of several isolated molecules or several molecular layers, preferably from 2 to around 300 layers. These samples may be organic or inorganic molecules. These samples may also be metal, semiconductor or insulator nanoobjects. Such nanoobjects may be atomic lines, blocks or islands. The quantity of the sample deposited is defined according to the objective of the experimenter. By way of example, it is preferable to deposit a small quantity of a sample on the substrate according to the invention in order to analyze isolated molecules. Thus, the method according to the invention is particularly suited for studying the chirality of organic molecules since it enables imaging of isolated molecules. Conversely, by depositing a large quantity of molecules on the substrate, the method according to the invention allows the self-assembly properties of molecules to be determined.

Organic molecules can be deposited by evaporation on the substrate. The sample is purified, in particular by degassing or sublimation, then evaporated at low pressure in order to be deposited. The thickness of the deposit is easily controlled using any means known to the person skilled in the art, such as a quartz oscillator. The evaporation temperature is chosen depending on the molecules to be deposited. When a Knudsen cell is used, the pressure inside the cell is low, preferably at a pressure less than $10^{-9}$ Tor, more preferably less than $3.10^{-10}$ Tor. The quantity of molecules deposited may also vary from a few isolated molecules through to film thicknesses of several hundred angstroms and through to about three hundred molecular layers.

The method may be coupled with any other atomic imaging method which uses a similar tip, in particular the methods employed in STM and AFM.

In the method according to the invention, the emitted photons are generated by intrinsic direct transition localized at the surface of the sample, permitting its imaging with atomic resolution. The employment of a large gap substrate has the advantage of confining the carriers (electrons and holes) to its surface, thus preserving its luminescence properties. Consequently, thanks to the method according to the invention, it is possible to image samples deposited on its surface with atomic or molecular resolution.

When the substrate is a silicon carbide, imaging is possible thanks to the method according to the invention of coupling between dangling bonds of Si atoms belonging to two rows of adjacent dimers. Such a result is not conceivable through STM microscopy in topographic mode or through the experimental study of electronic properties by photoemission. It is also possible to image with atomic resolution silver (Ag) atoms on the surface of SiC, on lines of Si, or lines or layers of Ag. The method according to the invention can also be applied to metals with a full or almost full d-band selected from the group consisting of Au, Cu, Pt and the transition metals. The transition metals may be niobium, tungsten, molybdenum or titanium. Likewise, the method according to the invention enables imaging of organic molecules such as perylenetetracarboxylic dianhydride (PTCDA), pentacene, sexithiophene and all the other thiophenes, triphenylene, benzene and its derivatives, pyrrole, TRIMA (diacetyl paraterphenyl), phthalocyanine. Any other 0D, 1D, 2D or 3D organic molecule can also be imaged through the method according to the invention.

The invention also relates to the use of an indirect gap semiconductor substrate with a gap greater than that of silicon, preferably greater than 1.5 eV, for imaging a sample by photon-emission scanning tunneling microscopy. Advantageously, the substrate is a silicon carbide. The excitation energy of the sample is preferably less than the gap of the substrate according to the invention on which said sample is deposited. Use of an indirect gap semiconductor substrate, greater than the gap of silicon, preferably greater than 1.5 eV, to image a sample by photon emission scanning tunneling microscopy.

The invention also relates to imaging devices for implementing the method according to the invention. Such devices are of scanning tunneling microscope type, STM or AFM with a metal tip.

The invention will be better understood on reading the following examples and figures and which illustrate it in a nonexhaustive manner.

DESCRIPTION OF THE DRAWINGS

FIG. 3: This is the representation of the topographic and photon-emission STM imaging mechanisms. a) energy diagram for field emission and representation of the $\pi^*_2$ surface state responsible for photon emission; b) wave functions of the various states responsible for field emission tunnel currents; c) energy diagram for field emission and representation of the $\pi^*_2$ and $\pi^*_1$ surface states responsible respectively for the topography and for photon emission in tunneling conditions; d) wave functions of the various states responsible for the tunnel currents in tunneling conditions.

DETAILED DESCRIPTION OF EXEMPLARY EMBODIMENTS

Examples

The following examples have been produced with the help of an Omicron brand scanning tunneling microscope; the electronics are adapted according to "F. Silly, F. Charra, Ultramicroscopy 99, 159 (2004)"; the counter card used is standard in order to allow simultaneous photon and topographic imaging. A silicon carbide substrate having a silicon-terminated and c(4×2) reconstructed surface was used. Silicon carbide is an indirect gap semiconductor, which forbids direct optical transitions and hence the existence of luminescent processes in the volume.

The photons are collected while scanning with the tungsten tip of the microscope in the following conditions: It (intensity of the total current crossing the tunnel junction)=30 nA and Vt (bias)=±5 V. The following examples show that the photons directly take account of the surface states of the c(4×2) reconstruction and have come from a radiative process equivalent to that encountered in direct gap semiconductors.

Example 1

Tip Bias is Greater than that of the Substrate

Figure 1B:
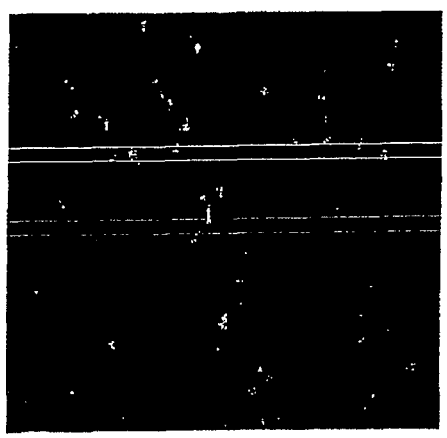
FIG. 1: This is a surface of β-SiC(001)-c(4×2). a) 10×10 nm$^2$ STM image, topography of occupied electronic states; b) photon yield image <ρ>image=6.71.10$^{-9}$ photons/electron.
Figure 1A:

The experiment is carried out in field emission conditions. These are tunnel transition conditions obtained when the bias voltage is sufficiently large for the Fermi level on the tip side to be greater than the level of the vacuum on the substrate side. The electrons then pass between the tip and the junction toward unbonded states. It is observed that the resolution at the atomic level in topographic mode is decreased (FIG. 1). For a positive bias between the tip and the surface, the current flows from the sample to the tip. With regard to the photon emission image, the resolution at the atomic scale and the photon map obtained is characteristic of the specific electronic states of the c(4×2) reconstruction. The photon yield corresponds directly to the proportion of electrons participating in photon emission. The majority of the electrons participate in the topographic imaging and only a tiny portion participate in the emission of photons. The electrons can pass in an elastic manner between the electronic surface state of the SiC towards an electronic state of the tip. The electrons torn from the surface at the surface state level create holes locally. An electron-hole recombination at the surface level can then generate a photon. The fact that the inelastic mechanism is produced in electronic surface states explains the fact that atomic resolution with photons is obtained [FIG. 3a]. FIG. 3 represents the substrate surface (1) separated through an area of ultrahigh vacuum (2) by a tunnel distance from the tip (3) and the energy states.

Example 1

Tip Bias is Less than that of the Substrate

In a Second Case, Contamination of the Tip (3) by a Few O, H, CO or NO atoms or molecules in the residual vacuum allows its work function to be increased. The topographic [FIG. 2a] and photon-emission [FIG. 2b] images have resolution at the atomic scale.

Figure 2B:
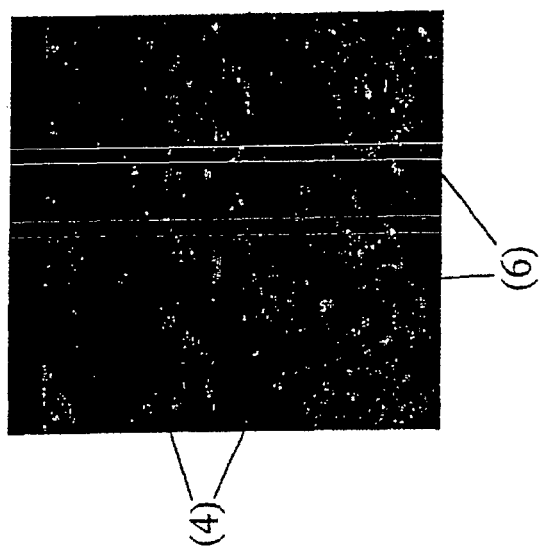
FIG. 2: This is a surface of β-SiC(001)-c(4×2). a) 20×20 nm$^2$ STM image, topography of occupied electronic states; b) photon yield image <ρ>image=1.09.10$^{-7}$ photons/electron.
Figure 2A:
Figure 4A:
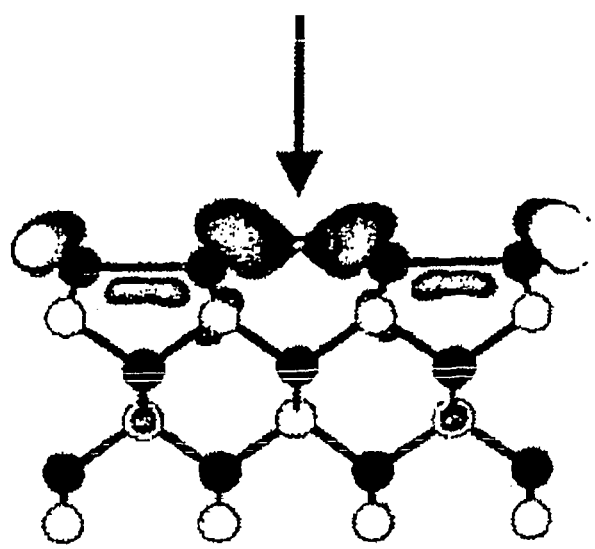
FIG. 4: This is a representation by theoretical calculation of surface atoms of a SiC substrate; the coupling between dangling bonds is indicated by an arrow: a) side view, b) view from above.
Figure 4B:
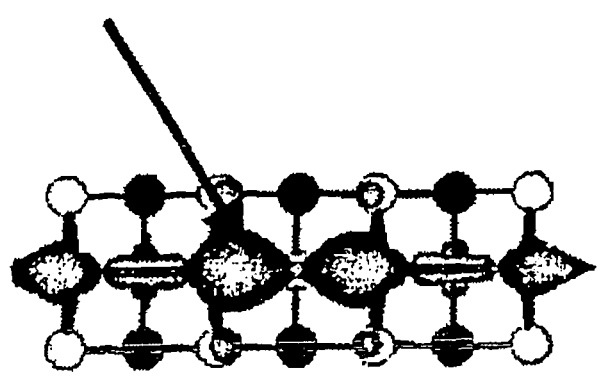

The presence of lines of silicon dimers (4) is observed no matter which is the mode of imaging—topographic or photon-emission (FIGS. 2a and 2b). The coupling between dangling bonds, represented in FIG. 4, predicted by calculus ab initio [Aristov et al., Phys. Rev. B 69, 245326 (2004)], has thus been experimentally demonstrated by imaging in photon-emission mode at atomic resolution. It is noteworthy that a 90° shift in the orientation of the "observed lines" is observed perfectly depending on whether the topographic (5) or the photon-emission (6) mode is used (FIGS. 2a and 2b). This is due to the fact that the emission mode enables visualization of the coupling between dangling bonds of the two Si atoms belonging to two rows of adjacent dimers (FIGS. 4a and 4b, which show the models established by theoretical calculations).

The topographic image is characteristic of $\pi^*_2$ electronic states of the c(4×2) while the photon-emission image depends (FIG. 3) on the $\pi^*_1$ state, a deeper electronic state. The photon yield is much greater than previously, but remains negligible relative to the main tunnel current, which is responsible for the topographic image. It is possible for the electrons to pass from the two states $\pi^*_1$ and $\pi^*_2$ of the surface (1) toward the states of the tip (3) in an elastic manner. The state $\pi^*_1$ is deeper than the state $\pi^*_2$; its wave function therefore penetrates the tunnel barrier less deeply. The current coming from $\pi^*_1$ will therefore decrease more rapidly than the current coming from $\pi^*_2$ if Z is increased, which is in agreement with the measured variation curves of the quantum yield, as a function of the height of the tip relative to the substrate. During scanning, the electrons coming from $\pi^*_1$ create holes locally. Electron-hole recombination can therefore explain the creation of a photon [FIG. 3c]. Here again, the recombination occurs between the surface states; this mechanism can account for the atomic resolution obtained in photon emission and for the dependence on clearly identified electronic states.

Example 3

Deposition of as Layer of PTCDA, Pentacene and Sexithiophene on a Silicon Carbide Surface Layers of PTCDA have been formed at ultrahigh vacuum on a SiC substrate at ambient temperature or raised to a higher temperature that can range through to 100° C. (80° C. is an advantageous temperature). The source consists of commercial PTCDA (Aldrich) correctly purified beforehand by degassing and/or sublimation and placed in a Knudsen cell. During evaporation, the temperature of the cell is maintained at a temperature range from 250° C. to 300° C. (270° C. representing an advantageous temperature) with a pressure in the evaporation chamber not exceeding $10^{-9}$ Torr (preferably $3.10^{-10}$ Torr). The deposition rate is controlled in real time by a quartz oscillator and is around 0.2 monolayers per minute. It may be increased with the temperature of the source. The quantity of PTCDA deposited may range from a few isolated molecules through to film thickness of several hundred angstroms, through to 800 Å.

The deposition conditions for pentacene and sexithiophene are similar to those of PTCDA. The layers of sexithiophene or pentacene are formed at ultrahigh vacuum on substrates raised to a temperature of 80° C. (pentacene) or 120° C. (sexithiophene). The source of commercial pentacene (Aldrich) is purified beforehand by sublimation, and sexithiophene is synthesized and purified by column chromatography. The material is placed in a Knudsen cell. During evaporation, the temperature of the cell is maintained at 290° C. (sexithiophene) or 320° C. (pentacene) with a pressure in the evaporation chamber not exceeding $10^{-9}$ Torr. The deposition rate is controlled in real time by a quartz oscillator and corresponds to rates of 2 to 4 monolayers per minute for sexithiophene and pentacene.

The invention claimed is:

1. A photon-emission scanning tunneling method for imaging a sample, comprising the following steps:
    deposition of a sample on a semiconductor substrate having an indirect gap greater than that of silicon, preferably greater than 1.5 eV, and a reconstructed surface with an excitation energy of less than the gap value;
    application of a potential $V_1$ to the substrate;
    scanning of the sample by an electron injection and/or extraction device at a potential $V_2$, such that the potential difference $V_t$ between $V_1$ and $V_2$ enables a tunnel current to appear between the substrate on which the sample is deposited and the device; and
    detection of a photon map of the substrate's surface with an unique character,
    imaging of the sample by detection of perturbation effects linked with the presence of the sample on the surface of the substrate.

2. The method as claimed in claim 1, wherein the gap of the semiconductor substrate is between 2.2 and 3.3 eV.

3. The method as claimed in claim 1, comprising the following steps:
    deposition on a β-SiC substrate, the surface of which is silicon terminated and c (4×2) reconstructed, of the sample with an excitation energy of less than the gap value;
    application of a potential $V_1$ to the substrate;
    scanning of the sample by an electron injection and/or extraction device at a potential $V_2$, such that the potential difference $V_t$ between $V_1$ and $V_2$ enables a tunnel current to appear between the substrate on which the sample is deposited and the device; and
    detection of a photon map of the surface characteristic of lines of silicon dimmers on the surface of the c(4×2) reconstructed surface of the β-SiC substrate,
    imaging of the sample by detection of perturbation effects between the sample present on the surface of the substrate and the photon map.

4. The method as claimed in claim 1, wherein the electron injection/extraction device is a metal tip.

5. The method as claimed in claim 4, wherein the metal tip comprises a metal selected from among silver, platinum, iridium, tungsten and an alloy of these.

6. The method as claimed in claim 1, wherein the sample to be analyzed is deposited on the substrate at low pressure, preferably at a pressure less than $10^{-9}$ Torr, more preferably less than $3.10^{-10}$ Torr.

7. The method as claimed in claim 6, wherein the thickness of the sample deposited is at least 1 monolayer of several isolated molecules or several molecular layers, preferably from 2 to around 300 layers.

8. The method as claimed in claim 1, wherein the tip is biased, its bias being greater than that of the substrate.

9. The method as claimed in claim 1, wherein the tip is biased, its bias being less than that of the substrate.

10. The method as claimed in claim 9, wherein the tip is contaminated by foreign elements chosen from among O, H, CO and NO.

11. The method as claimed in claim 1, further comprising a photomultiplication step.

12. The method as claimed in claim 1, further comprising a focusing step.

13. The method as claimed in claim 12, wherein the focusing step employs a lens with a large numerical aperture.

14. An imaging device for implementing the method as defined in claim 1.

15. The use of an indirect gap semiconductor substrate having a gap greater than that of silicon, preferably greater than 1.5 eV, by:
   depositing a sample to be analyzed on the substrate,
   imaging the sample by photon-emission scanning tunneling microscopy.

16. The use as claimed in claim 15, wherein the excitation energy of the sample is less than the gap of the indirect gap semiconductor substrate on which said sample is deposited.

17. The use as claimed in claim 15, wherein the indirect gap semiconductor substrate is silicon carbide.

18. A photon-emission scanning tunneling microscopy sample carrier, wherein the sample carrier comprises a substrate with a sample carrying part for receiving a sample to be deposited thereon, thereby enabling an analysis of the sample by photon-emission scanning tunneling microscopy, and wherein the substrate has an indirect gap, greater than the gap of silicon, preferably greater than 1.5 eV and a reconstructed surface with an excitation energy of less than the gap value.

19. The sample carrier as claimed in claim 18, comprising in its electronic band diagram, at least in the conditions specific to photon-emission scanning tunneling microscopy, a permitted electronic transition at the center of the first Brillouin zone between a volume state and a surface state.

* * * * *